Nov. 25, 1952
B. O'BRIEN, JR., ET AL
INSPECTION DEVICE FOR DETERMINING
HEIGHT OF DOTS ON ENGRAVED PLATES
2,619,004
Filed Aug. 18, 1950
2 SHEETS—SHEET 1
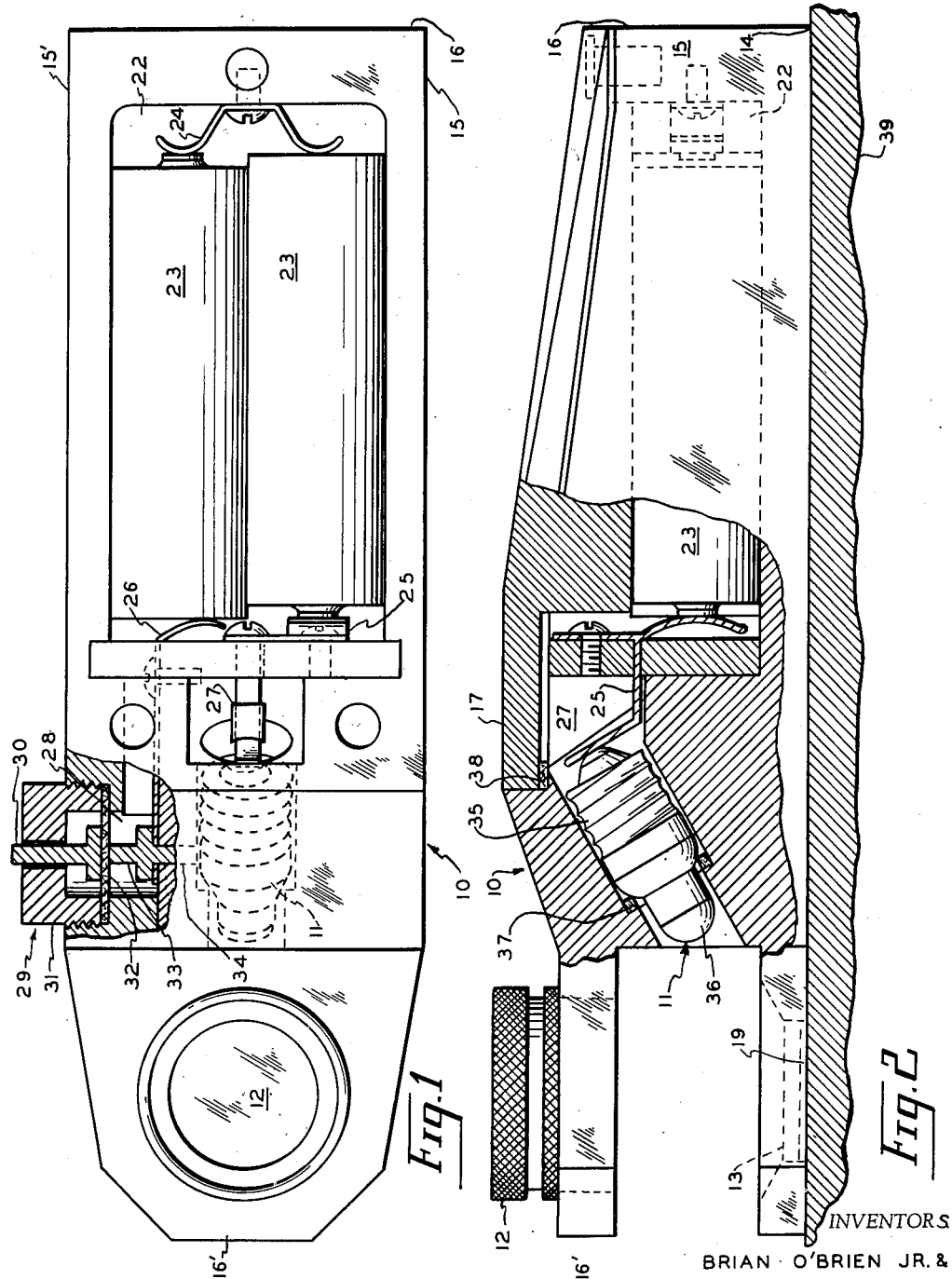
INVENTORS
BRIAN O'BRIEN JR. &
CLARENCE M. FLINT
BY Stowell & Evans
ATTORNEYS Nov. 25, 1952

B. O'BRIEN, JR., ET AL 2,619,004

INSPECTION DEVICE FOR DETERMINING
HEIGHT OF DOTS ON ENGRAVED PLATES

Filed Aug. 18, 1950

INVENTORS.
BRIAN O'BRIEN JR. &
CLARENCE M. FLINT

BY *Stowell & Evans*

ATTORNEYS

Patented Nov. 25, 1952

2,619,004

UNITED STATES PATENT OFFICE 2,619,004

INSPECTION DEVICE FOR DETERMINING HEIGHT OF DOTS ON ENGRAVED PLATES

Brian O'Brien, Jr., Easton, Pa., and Clarence M. Flint, Chappaqua, N. Y., assignors to Research Corporation, New York, N. Y., a corporation of New York Application August 18, 1950, Serial No. 180,172

1 Claim. (Cl. 88—14)

This invention relates to an inspection device for use in the examination of material surface texture, and in particular to an inspection device for photo-engravers whereby a rapid and efficient determination of the depth and size of halftone dots on engraved plates may be made.

A principal object of the invention is the provision of an instrument having a unitary and compact construction which includes a source of illumination and a magnifying optical system so arranged that, when the device is positioned on the surface to be inspected, the axis of the source of illumination and the optical axis of the optical system are angularly disposed to intersect at the plane of the surface to be examined, whereby the surface is angularly illuminated and any irregularities on the surface thereof will cast shadows the length of which are determined by the height of the irregularities.

A further object is to provide such a device that is adapted to lie flat on the object to be examined with a low center of gravity, assuring a constant fixed angle of illumination and inspection.

A further object is to provide an inspection device which is sturdy in its construction, inexpensive to manufacture, simple as to its parts and light in weight.

These and other objects and advantages are provided by the instrument for inspecting the surface texture of materials comprising a casing having a substantially plane bottom surface area and a top member spaced from the bottom of the casing by a distance not exceeding the shortest horizontal dimension of the bottom surface area, a magnifying optical system carried by the casing, the bottom surface being provided with an aperture in the field of the optical system, a source of illumination housed in the casing, and means for projecting a beam of light therefrom into the aperture whereby the axis of the beam of light and the optical axis of the optical system are angularly disposed to intersect at the plane of the surface to be inspected.

The invention will be more particularly described with reference to the illustrative embodiment shown in the accompanying drawings in which:

Fig. 1 is a plan view of the device of the invention with the top cover plate removed and a portion of the case broken away to show more clearly the electrical connections;

Fig. 2 is a side elevation of the device shown in Fig. 1 with a portion broken away to show the details of the illuminating system;

The inspection device of the invention is particularly adapted to provide photo-engravers with a rapid means of estimating the depth and size of highlight half-tone dots during the etching process and provides:

(1) a stable instrument adapted to rest flat on the surface to be examined;
(2) an optical system for magnification of the area to be inspected;
(3) collimated illumination in the field of the optical system; and
(4) a scale or reticle for rapid depth and size estimation.

In general the inspection device comprises a casing or housing 10, a source of illumination 11, an optical system 12, and an inspection aperture 13.

Figure 3:
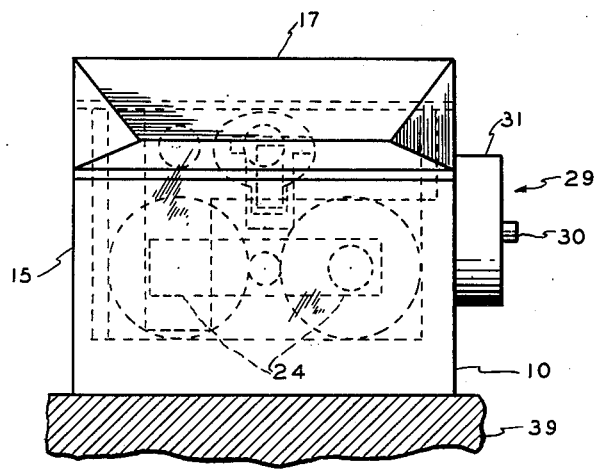
Fig. 3 is an end view of the inspection device shown in Figs. 1 and 2.

With reference to Figs. 1, 2 and 3 of the drawings the casing 10 has a substantially plane bottom surface 14, sides 15 and 15', ends 16 and 16' and top 17. The casing may be cut or molded from any suitable material such as metal, glass, plastic or the like, the preferred material being a tough, non-electrically conductive plastic such as, "Lucite," a methylmethacrylate resin.

The sides of the casing are preferably kept as low as possible in order to provide the instrument with a low center of gravity thus assuring a stable device. This feature is highly desirable in maintaining a constant fixed angle of illumination and inspection.

In the top of the casing 10 at its front end is a simple magnifying optical system 12, provided with a screw type mount. Beneath the lens and centrally positioned within the optical field of the lens is the inspection aperture 13. Within the aperture there may be provided an inspection scale 19. The scale is mounted parallel to and within the plane of the bottom of the instrument casing, so that both the surface 39 of the plate to be inspected and the scale will lie within the depth of focus of the optical system. The scale or reticle 19 preferably should be made from some material having a hardness index above that of any of the material to be inspected in order to reduce to a minimum the scratching of the reticle surface. Reticles of transparent synthetic sapphire have proven very satisfactory for such purpose.

Figure 4:
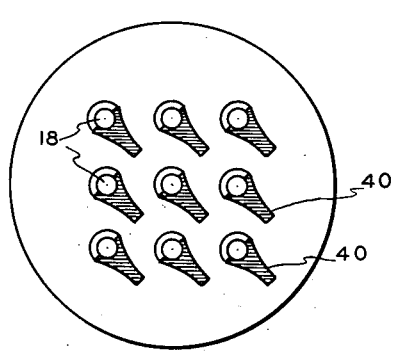
Fig. 4 is an enlarged diagrammatic view of the field of the inspection device showing the shadows cast by highlight dots of a correctly engraved half-tone plate.
Figure 5:
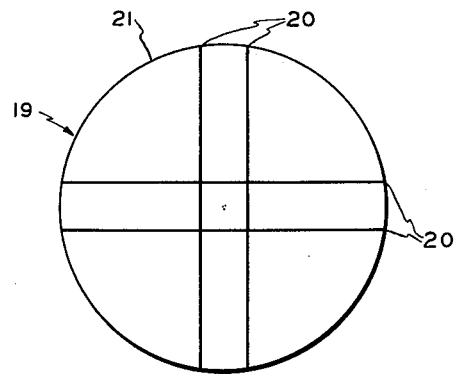
Fig. 5 is an enlarged view of a typical measuring scale employed in the instrument of the invention.

The reticle pattern can be either an optical scale or some geometric pattern of known dimensions, the latter being more satisfactory for obtaining a rapid estimation of size of the examined material. A typical reticle pattern is shown in Fig. 5 of the drawings, having double crossed lines 20, within a circle 21. As hereinbefore mentioned, a reticle is not necessary to the functioning of the device of the invention as the angle of the incident light beam may be fixed whereby the shadows cast by correctly engraved highlight dots will extend, for a given half-tone screen and dot, a predetermined distance. A typical relationship is shown in Fig. 4, which diagrammatically represents an aperture view of a portion of a correctly engraved half-tone plate having 65 lines to the inch, and highlight dots 18 of .002 inch top diameter, and in which the light beam is angularly arranged to cast shadows 40 of the highlight dots just halfway between diagonally opposite dots when the depth of etch is .006 of an inch. Under these conditions the collimated light intersects the plate to be inspected at an angle of about 31 degrees, 15 minutes, to the axis of the magnifying optical system.

At the opposite end of casing 10 from the lens 12 is a recessed portion 22 adapted to house a pair of standard dry cell batteries 23, which supply electrical energy for the light bulb 11. An electrical connector 24 of the spring type is secured to the back end 16 of the casing, while a pair of spring connectors 25 and 26 providing the positive and negative electrical connections are located at the forward end of the battery recess 22. Terminal 25, as more clearly shown in Fig. 2 of the drawings, extends through a portion of the casing, and into the light bulb recess 27 to provide the central electrical terminal for bulb 11. Spring connector 26 similarly extends through a portion of the casing, and into the switch recess 28.

The light switch 29 comprises an actuating plunger 30, slidably secured within recess 28 by means of a bushing 31 threadedly mounted in the side wall 15' of the casing, a resilient nonconductive gasket 32 and a metallic inner switch plunger 33. The inner end 34 of switch plunger 33 is normally held out of engagement with the metal terminal socket 35 of the light bulb 11, by spring 26; however, when the plunger 30 is pressed inwardly against the resilient gasket 32, the inner end 34 of plunger 33 is pressed into contact with the socket 35 against the force of spring 26, thus completing the electrical circuit, as shown in the drawings.

The light bulb 11, shown in the illustrative embodiments of the invention is a standard "penlight" bulb having a built-in collimating lens 36. These bulbs give a roughly collimated beam, which has a tendency to give false depth indications at various points within the inspection field. Where work of finer quality is required it has been found desirable to provide a corrected collimating lens and a prefocused bulb in place of the "penlight" bulb.

In the preferred form of the invention the entire electrical system of the inspection device is sealed by means of gaskets to make the instrument immersion proof and to protect the metallic electrical connections from moisture and acid from the plate etching baths. These sealing gaskets are shown in Figs. 1 and 2 of the drawing at 32, 37 and 38, the gasket 38 extending about the periphery of the top piece 17.

From the foregoing description, it will be seen that the present invention provides an inspection device that is adapted to lie flat on the object to be examined with a low center of gravity, thus assuring a constant fixed angle of illumination and inspection, whereby the aims, objects and advantages of the invention are fully accomplished.

It will be evident that various modifications may be made in the form and construction of the inspection device, for example, the invention is not limited to the use of batteries as the source of electrical power for illuminating the area to be inspected, but the inspection device may be provided with an extension cord to be plugged into the line current, or both battery and line current adaptors may be provided.

We claim:

An instrument for determining the height of highlight dots on photo-engraved plates comprising an elongated casing, including a plane bottom surface and a top member spaced therefrom, having a substantially low center of gravity, a magnifying optical system carried by the top member, said bottom surface being provided with an aperture in the field of said optical system, means for producing shadows of the highlight dots the length of which are determinative of the height of the dots, said means including a source of illumination housed in the elongated casing, and a lens for projecting a beam of collimated light therefrom into said aperture and against the sides of the highlight dots of the plate to be inspected at an angle of about 31 degrees, 15 minutes, to the axis of the magnifying optical system.

BRIAN O'BRIEN, Jr.
CLARENCE M. FLINT.

REFERENCES CITED

The following references are of record in the file of this patent:

UNITED STATES PATENTS

| Number | Name | Date |
|---|---|---|
| 1,814,540 | Bander | July 14, 1931 |
| 2,048,879 | Moran | July 28, 1936 |
| 2,396,440 | Schmidt | Mar. 12, 1946 |
| 2,448,974 | Guttmann | Sept. 7, 1948 |
| 2,482,598 | Roos | Sept. 20, 1949 |

FOREIGN PATENTS

| Number | Country | Date |
|---|---|---|
| 27,658 | Great Britain | Dec. 17, 1903 |